US011928915B2

(12) United States Patent
Penacho et al.

(10) Patent No.: US 11,928,915 B2
(45) Date of Patent: Mar. 12, 2024

(54) MERGED GAME MATRICES ON AN ELECTRONIC GAMING MACHINE

(71) Applicant: Aristocrat Technologies Australia Pty Limited, North Ryde (AU)

(72) Inventors: Gary Joseph Penacho, Henderson, NV (US); Thomas Tuomey, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 17/581,538

(22) Filed: Jan. 21, 2022

(65) Prior Publication Data

US 2022/0148374 A1 May 12, 2022

Related U.S. Application Data

(63) Continuation of application No. 16/902,930, filed on Jun. 16, 2020, now Pat. No. 11,238,692, which is a continuation of application No. 15/976,604, filed on May 10, 2018, now Pat. No. 10,713,882, which is a continuation of application No. 29/616,120, filed on Sep. 1, 2017, now Pat. No. Des. 841,048.

(60) Provisional application No. 62/553,990, filed on Sep. 4, 2017.

(51) Int. Cl.
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC ............................ G07F 17/3213; G07F 17/34
USPC ........................................................ 463/20
See application file for complete search history.

(56) References Cited

U.S. PATENT DOCUMENTS

| | | | |
|---|---|---|---|
| D299,142 | S | 12/1988 | Berg |
| D479,243 | S | 9/2003 | Ohashi |
| D562,338 | S | 2/2008 | Keohane |
| D579,456 | S | 10/2008 | Chen |
| D628,208 | S | 11/2010 | Potemski |
| D628,583 | S | 12/2010 | Kurozumi |
| D658,195 | S | 4/2012 | Cranfill |
| D664,550 | S | 7/2012 | Lee |
| D666,625 | S | 9/2012 | Gilmore |
| D668,261 | S | 10/2012 | Arnold |
| D668,671 | S | 10/2012 | Zaman |
| D669,091 | S | 10/2012 | Cranfill |
| D676,862 | S | 2/2013 | Ho Kushner |

(Continued)

FOREIGN PATENT DOCUMENTS

AU 2016228227 A1 4/2017

OTHER PUBLICATIONS

Office Action, dated Sep. 12, 2019, in U.S. Appl. No. 15/976,604, with a filing date of May 10, 2018.

(Continued)

*Primary Examiner* — Allen Chan
(74) *Attorney, Agent, or Firm* — McAndrews, Held & Malloy, Ltd.

(57) ABSTRACT

A method of playing a feature game on a gaming machine. A display displays a first game and a second game. A game controller determines if a merging condition occurs, and if a merging condition occurs, animates a merging of the first game and the second game into a merged game at the display. The merged game has a plurality of display positions from the first game, the second game, and a set of additional display positions.

20 Claims, 11 Drawing Sheets

(56) References Cited

U.S. PATENT DOCUMENTS

| | | | |
|---|---|---|---|
| D679,722 | S | 4/2013 | Ray |
| D695,779 | S | 12/2013 | Edwards |
| D695,780 | S | 12/2013 | Edwards |
| D697,938 | S | 1/2014 | Lee |
| D702,701 | S | 4/2014 | Scharfeld |
| 8,832,598 | B2 | 9/2014 | Hirata |
| D719,969 | S | 12/2014 | Ebtekar |
| D728,585 | S | 5/2015 | Lee |
| D732,562 | S | 6/2015 | Yan |
| D750,659 | S | 3/2016 | Cranfill |
| D751,097 | S | 3/2016 | Sarafa |
| D757,786 | S | 5/2016 | Yan |
| D758,417 | S | 6/2016 | Chaudhri |
| D760,275 | S | 6/2016 | Zhang |
| D765,136 | S | 8/2016 | Lee |
| D771,111 | S | 11/2016 | Roberts |
| D772,240 | S | 11/2016 | Edstrom |
| D772,248 | S | 11/2016 | Quek |
| D772,273 | S | 11/2016 | Spector |
| D773,512 | S | 12/2016 | Miura |
| D778,310 | S | 2/2017 | Roberts |
| D785,007 | S | 4/2017 | Sugumaran |
| D785,664 | S | 5/2017 | Yao |
| D786,271 | S | 5/2017 | Randon |
| D790,563 | S | 6/2017 | Lam |
| D790,590 | S | 6/2017 | Hart |
| D791,168 | S | 7/2017 | Sun |
| D791,173 | S | 7/2017 | Hart |
| D792,451 | S | 7/2017 | Jeon |
| D794,661 | S | 8/2017 | Nishizawa |
| D794,664 | S | 8/2017 | Okabe |
| D800,745 | S | 10/2017 | Kyakuno |
| D801,354 | S | 10/2017 | Lee |
| D801,358 | S | 10/2017 | Jungmann |
| D801,995 | S | 11/2017 | Cho |
| D802,616 | S | 11/2017 | Hajimusa |
| D809,003 | S | 1/2018 | Sowden |
| D814,496 | S | 4/2018 | Bachman |
| D821,439 | S | 6/2018 | Sowden |
| D826,979 | S | 8/2018 | Rowny |
| D839,304 | S | 1/2019 | Penacho |
| D839,305 | S | 1/2019 | Hawkins |
| D841,048 | S | 2/2019 | Penacho |
| 2002/0047238 | A1 | 4/2002 | Ainsworth |
| 2006/0079313 | A1 | 4/2006 | Trainor |
| 2009/0227350 | A1 | 9/2009 | Inamura |
| 2011/0294567 | A1 | 12/2011 | Falciglia, Sr. |
| 2012/0040736 | A1 | 2/2012 | Penacho |
| 2014/0011567 | A1 | 1/2014 | Penacho |
| 2014/0094270 | A1 | 4/2014 | Cuddy |
| 2014/0162754 | A1 | 6/2014 | Tylman |
| 2014/0200066 | A1 | 7/2014 | Joshi |
| 2014/0295942 | A1 | 10/2014 | Kendall |
| 2015/0018070 | A1 | 1/2015 | Meyer |
| 2015/0212666 | A1 | 7/2015 | Daniel |
| 2015/0302703 | A1 | 10/2015 | Nelson |
| 2015/0356813 | A1 | 12/2015 | Mead |
| 2015/0379804 | A1 | 12/2015 | Casey |
| 2016/0093147 | A1 | 3/2016 | Penacho |
| 2016/0093150 | A1 | 3/2016 | Penacho |
| 2016/0189471 | A1 | 6/2016 | Penacho |
| 2017/0092047 | A1 | 3/2017 | Hendricks |
| 2018/0078847 | A1 | 3/2018 | Sorreta |
| 2018/0293846 | A1 | 10/2018 | Penacho |
| 2019/0073858 | A1 | 3/2019 | Penacho |
| 2019/0073859 | A1 | 3/2019 | Penacho |

OTHER PUBLICATIONS

Notice of Allowance dated Apr. 15, 2020 for U.S. Appl. No. 15/976,604 (pp. 1-7).

Notice of Allowance dated Apr. 15, 2020 for U.S. Appl. No. 15/976,637 (pp. 1-8).

Australian Examination Report No. 1 for App. No. AU2019279996, dated Jan. 11, 2021, 4 pages.

Australian Examination Report No. 1 for App. No. AU2019279999, dated Feb. 8, 2021, 6 pages.

Office Action (Notice of Allowance and Fees Due (PTOL-85)) dated Sep. 28, 2021 for U.S. Appl. No. 16/902,930 (pp. 1-7).

Office Action (Notice of Allowance and Fees Due (PTOL-85)) dated Oct. 14, 2021 for U.S. Appl. No. 16/933,905 (pp. 1-8).

Australian Examination Report No. 1 issued in App. No. AU2022200805, dated Feb. 22, 2023, 2 pages.

Australian Examination Report No. 1 issued in App. No. AU2022200134, dated Feb. 22, 2023, 3 pages.

900b 901
902
903
904
905
906
907
910
910

MERGED GAME MATRICES ON AN ELECTRONIC GAMING MACHINE

RELATED APPLICATIONS

This application is a continuation of U.S. patent application Ser. No. 16/902,930 filed on Jun. 16, 2020, entitled "Merged Game Matrices on an Electronic Gaming Machine," which claims priority to U.S. patent application Ser. No. 15/976,604 filed on May 10, 2018, which issued on Jul. 14, 2020, as U.S. Pat. No. 10,713,882, entitled "Merged Game Matrices on an Electronic Gaming Machine," which claims priority to U.S. Provisional Patent Application No. 62/553,990 filed on Sep. 4, 2017, entitled "A Gaming Machine," and is a continuation of U.S. Design application No. 29/616,120 filed Sep. 1, 2017, which issued on Feb. 19, 2019, as U.S. Design patent No. D841048, entitled "Display Screen or Portion Thereof with Transitional Graphical User Interface," which are hereby incorporated by reference herein in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

In some electronic gaming machines, a number of reels are spun to form an outcome. Each reel has a number of symbols. The outcome is evaluated based on the symbols spun up. While such gaming machines provide players with enjoyment, a need exists for new gaming systems in order to maintain or increase player enjoyment.

SUMMARY

One embodiment provides a method of merging a plurality of games into a merged game with an increased number of display positions. For example, the plurality of games may be played on a gaming machine that includes a display to display the plurality of games. A game controller determines from the games if a merging condition occurs, and if a merging condition occurs, merges two or more of the games into a merged game. The merged game has a plurality of display positions from the two or more of the games, and a set of additional display positions.

Another embodiment provides a gaming machine. The gaming machine includes a game controller to initiate a plurality of games, select a plurality of symbols for each of the games, and cause a display to display the selected symbols at display positions of each of the games. The game controller determines if a merging condition is met with respect to two of the games, merges the two of the games and inserts additional symbols between the merged two of the games in response to determining that a merging condition is met. The gaming machine also includes a payout mechanism that, if actuated, provides a payout.

DETAILED DESCRIPTION

Figure 1:
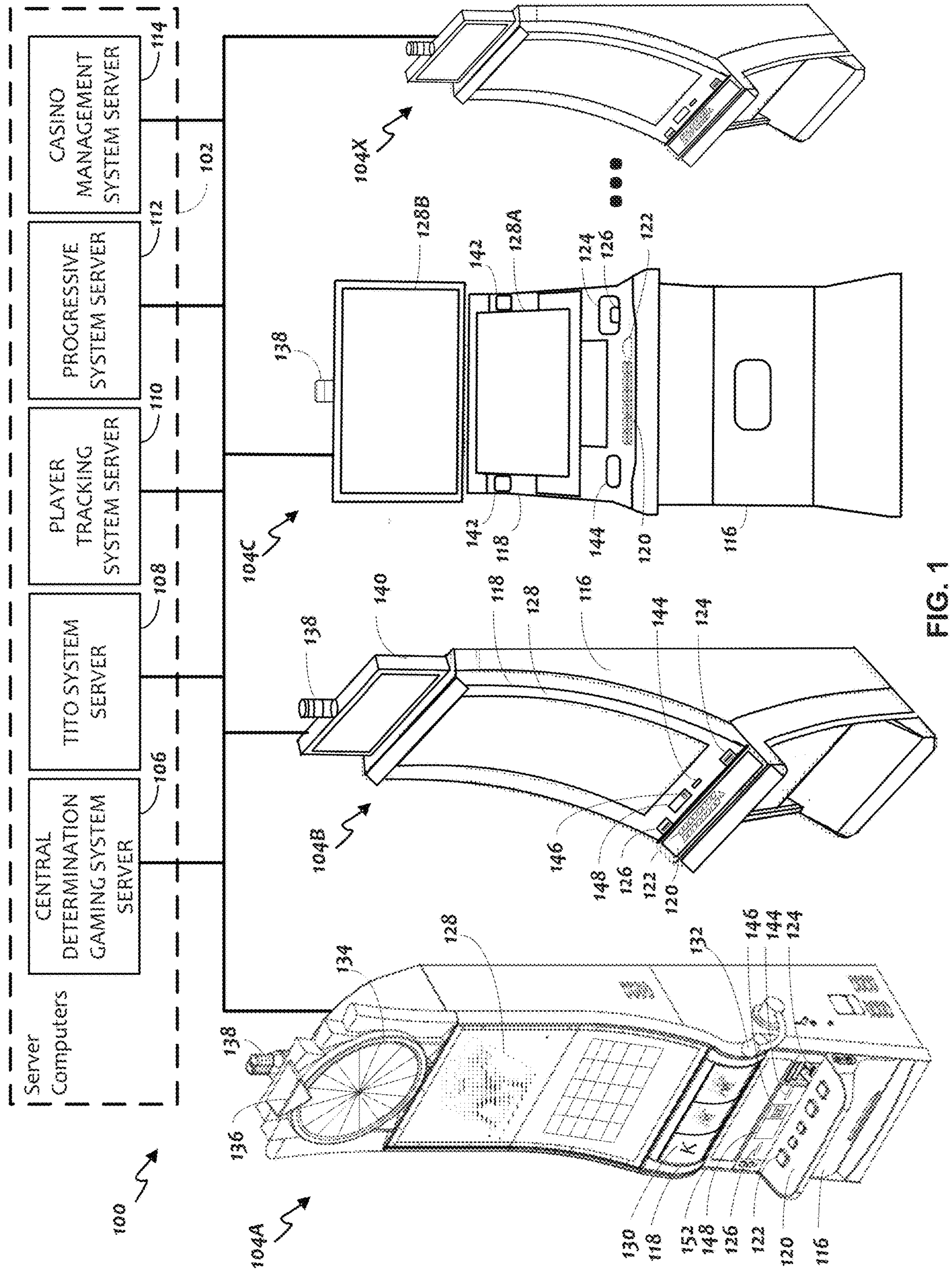
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 128 comprising a number (typically 3 or 5) of mechanical reels 130 with various symbols displayed on them. The reels 130 are independently spun and stopped to show a set of symbols within the gaming display area 128 which may be used to determine an outcome to the game.

In many configurations, the gaming machine 104A may have a main display 128 (e.g., video display monitor) mounted to, or above, the gaming display area 128. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 118 which may be used to initiate game play.

Figure 2:
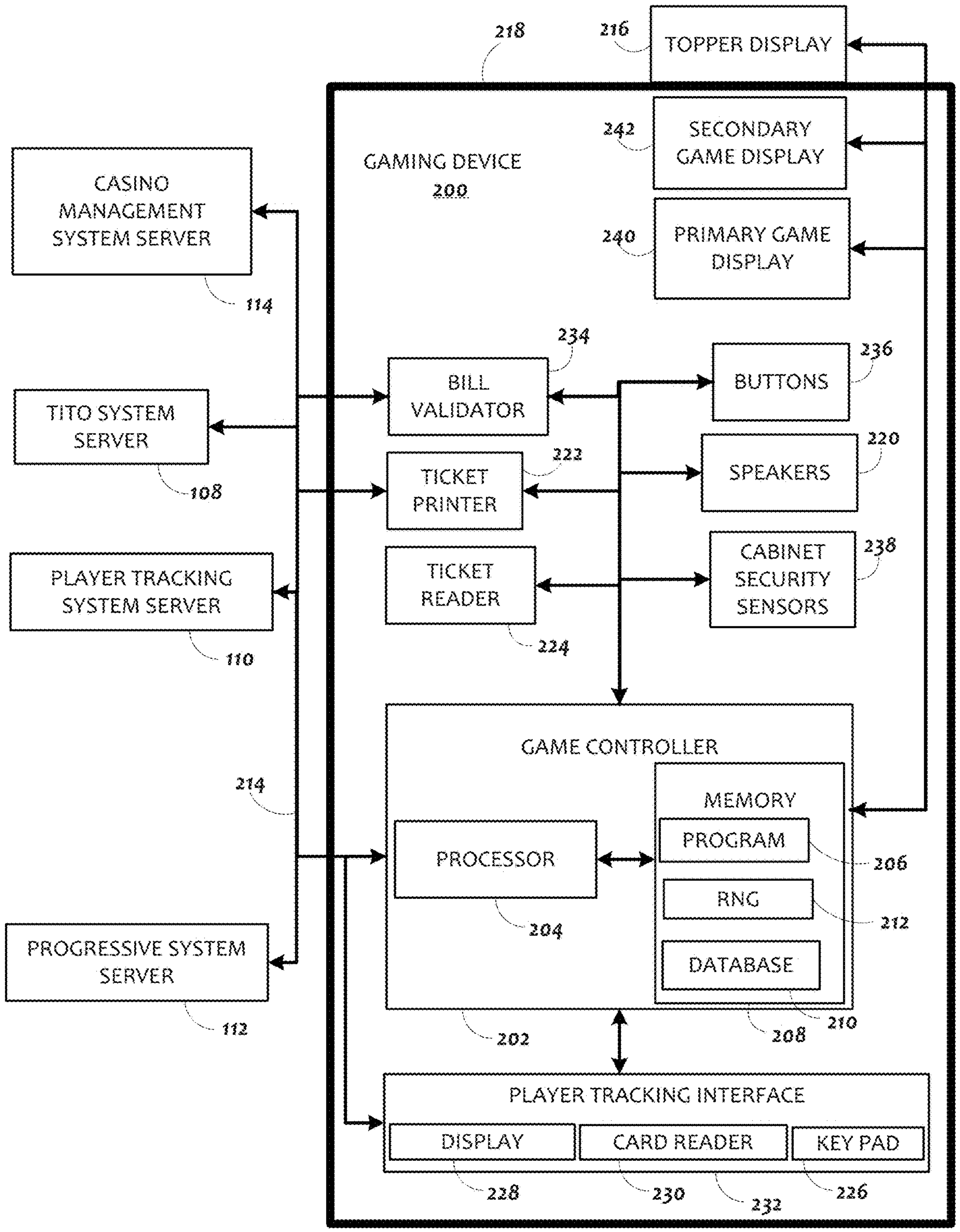
FIG. 2 is a block diagram showing various functional elements of an exemplary EGM.

Many or all the above described components can be controlled by circuitry (e.g., a gaming controller) housed inside the main cabinet 118 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 118 including a main door 116 which opens to provide access to the interior of the gaming device 104B. The main or service door 116 is typically used by service personnel to refill the ticket-out printer 126 and collect bills and tickets inserted into the bill validator 124. The main door 116 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, main display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. For example, a credit meter may display, monitor, and/or indicate a player's credit balance. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202. In some embodiments, the bill validator 234 or the card reader 230 may detect whether a physical item representing a monetary value, such as, a bill or a player tracking card has been received, so as to initiate a wagering activity.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism, such as a coin acceptor (not shown) or bill validator 234 to establish a credit balance on the gamine machine. The credit balance may be increasable and decreasable based on a wagering activity. In some embodiments, the credit balance is displayed on a credit meter (not shown). In some other embodiments, the credit meter may be stored in the memory 208, and/or the casino management system server 114. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing or actuating a payout mechanism such as a cash-out button to receive a ticket from the ticket printer 222). The ticket may be "cashed-in" for money or inserted into another machine to establish a credit balance for play.

Figure 3A:
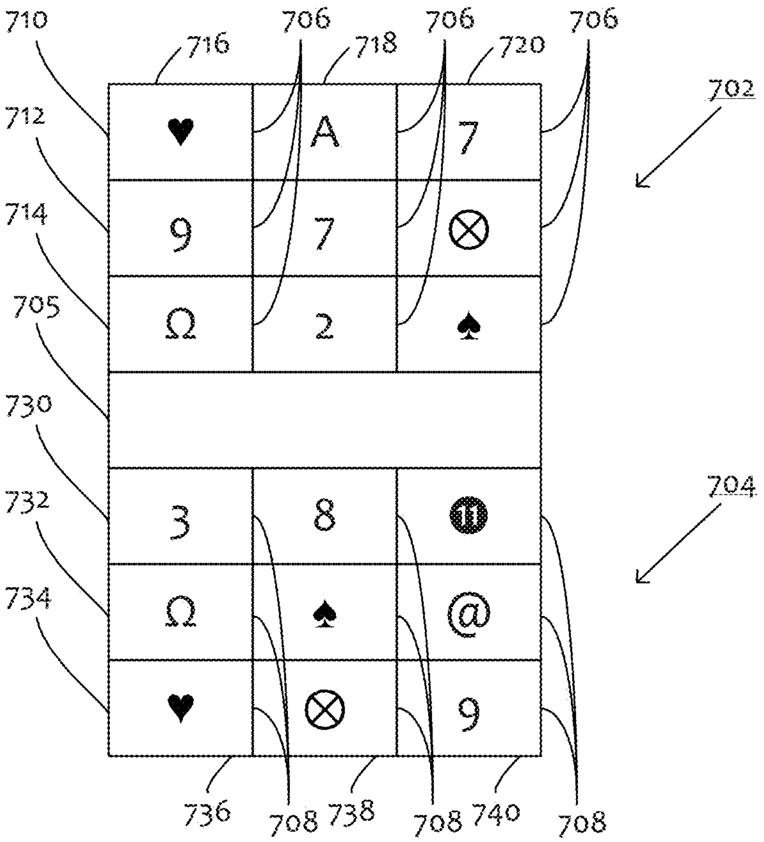
FIG. 3A illustrates a plurality of exemplary games.

FIG. 3A illustrates games 702, 704 displayed at a display (e.g., the primary game display 240 of FIG. 2). Game 702 is separated from game 704 by a separator 705. In some embodiments, the separator 705 may be animated as a barrier. In some other embodiments, the separator 705 may be animated in the form of a divider between game 702 and game 704. As shown, game 702 includes a 3×3 matrix of display positions 706 (three rows 710, 712, 714, and three columns 716, 718, 720). Similarly, game 704 includes a 3×3 matrix of display positions 708 (three rows 730, 732, 734, and three columns 736, 738, 740). In other embodiments, games 702, 704 may have different matrix sizes. For example, each of the games 702, 704 may have a 3×4 matrix of display positions. For another example, game 702 may have a 3×4 matrix of display positions, while game 704 may have a 3×3 matrix of display positions. In some embodiments, each of the display positions 706, 708 is an individual spinning reel. In other embodiments, each of the rows 710, 712, 714, 730, 732, 734 is an individual spinning reel of three display positions. In still other embodiments, each of the columns 716, 718, 720, 736, 738, 740 is an individual reel of three display positions.

In an example where each of the games 702, 704 has a 3×3 matrix of display positions 706, 708, and each of the columns 716, 718, 720, 736, 738, 740 is an individual reel of three display positions, when an entry bet or a wagering activity is made, or when a trigger event occurs in a base game, the game controller 202 of FIG. 2 plays games 702, 704 individually. In such a case, the game controller 202 of FIG. 2 randomly populates each of the display positions 706 with symbols from a first symbol set corresponding to game 702 to form a first game instance, and separately and randomly populates each of the display positions 708 with symbols from a second symbol set corresponding to game 704 to form a second game instance, as shown FIG. 3A. In some embodiments, the first symbol set and the second symbol set are the same. In other embodiments, the first symbol set and the second symbol set may be different. In some embodiments, the first symbol set and the second symbol set may share common symbols.

Figure 3B:
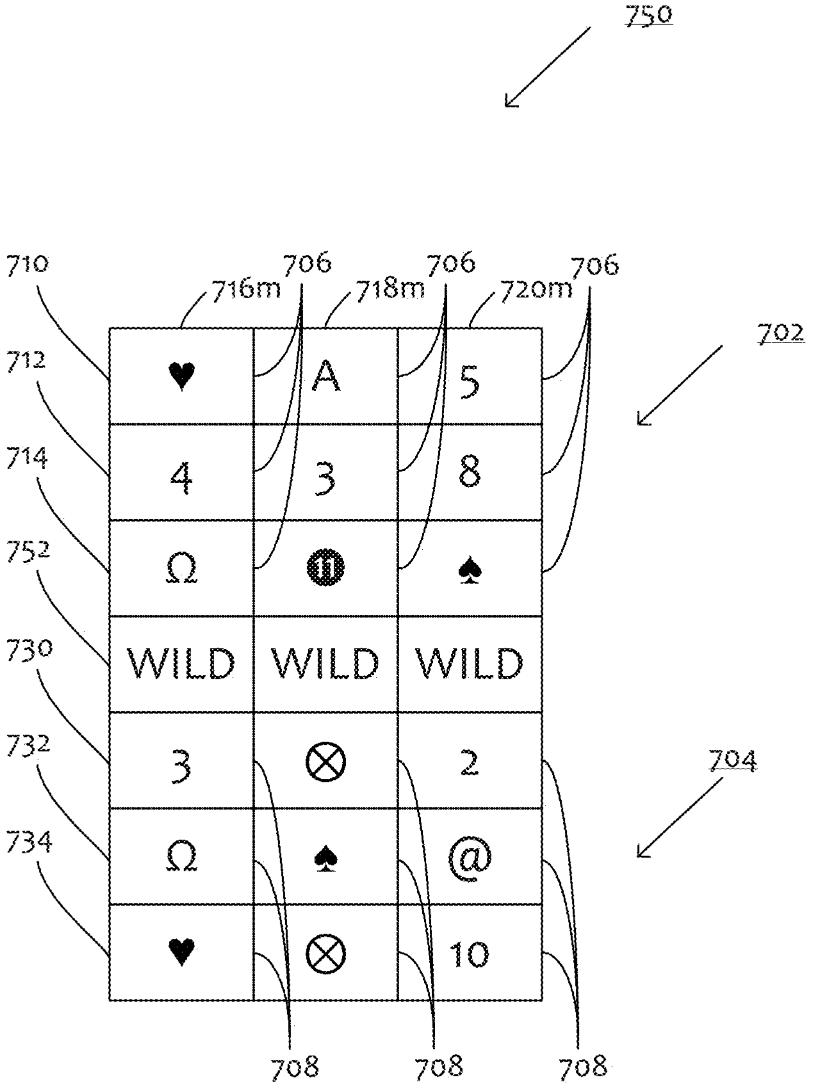
FIG. 3B illustrates an exemplary merged game with an additional group inserted between the games of FIG. 3A.

FIG. 3B illustrates an exemplary merged game 750 with a set of additional display positions 752 replacing the separator 705 between games 702, 704. For example, when the game controller 202 of FIG. 2 determines that a trigger event or a predetermined merging condition is met, the game controller 202 of FIG. 2 signals the primary game display 240 of FIG. 2 to merge the first game instance and the second game instance with the plurality of additional display positions 752. Merging of the first game instance and the second game instance with the additional display positions 752 forms a merged game instance with a third plurality of display positions. As shown, the merged game instance is a 7×4 matrix of contiguous display positions, including rows 710, 712, 714, 730, 732, 734, a row corresponding to the additional display positions 752, and merged columns 716*m*, 718*m*, 720*m*.

In some embodiments, after merging games 702, 704, the game controller 202 of FIG. 2 continues to play the games 702, 704 separately and continue to spin, while the additional display positions 752 are being populated with symbols from a special symbol set. For example, the game controller 202 of FIG. 2 randomly populates the additional display positions 752 with symbols from a special symbol set, before randomly populating each of the display positions 706, 708 with symbols. In some embodiments, the special symbol set may include wild symbols only. In some embodiments, a wild symbol may substitute for other symbols to potentially form a winning outcome in a game. As shown in FIG. 3B, the game controller 202 populates the plurality of additional display positions 752 with wild symbols from the special symbols set, while games 702, 704 continue to spin. In some other embodiments, the special symbol set may include wild symbols and other predetermined symbols. In such cases, the game controller 202 may spin the additional display positions and games 702, 704 concurrently. In still other embodiments, the special symbol set, the first symbol set, and the second symbol set have the same symbols.

In some other embodiments, after merging games 702, 704, the game controller 202 plays the merged game as a single merged game instance. For example, the game controller 202 may initially select symbols from a symbol set to populate each of the display positions 706, 708, and the additional display positions 752. In still other embodiments, after merging games 702, 704, the game controller 202 plays the merged game with symbols from a merged set of symbols from symbol sets used in game 702 and game 704. When the first symbol set and the second symbol set include common wild symbols, the merged game may have higher chances of selecting a wild from the merged set of symbols.

In an example where display positions 706, 708 are individual reels, when an additional wager is made, the game controller 202 may merge the first game instance and the second game instance into a single merged game instance (similar to the merged game 750 of FIG. 3B) with an additional group of reels (similar to the additional display positions 752 of FIG. 3B) added between the first game instance and the second game instance in merged columns 716*m*, 718*m*, 720*m*.

Figure 4A:
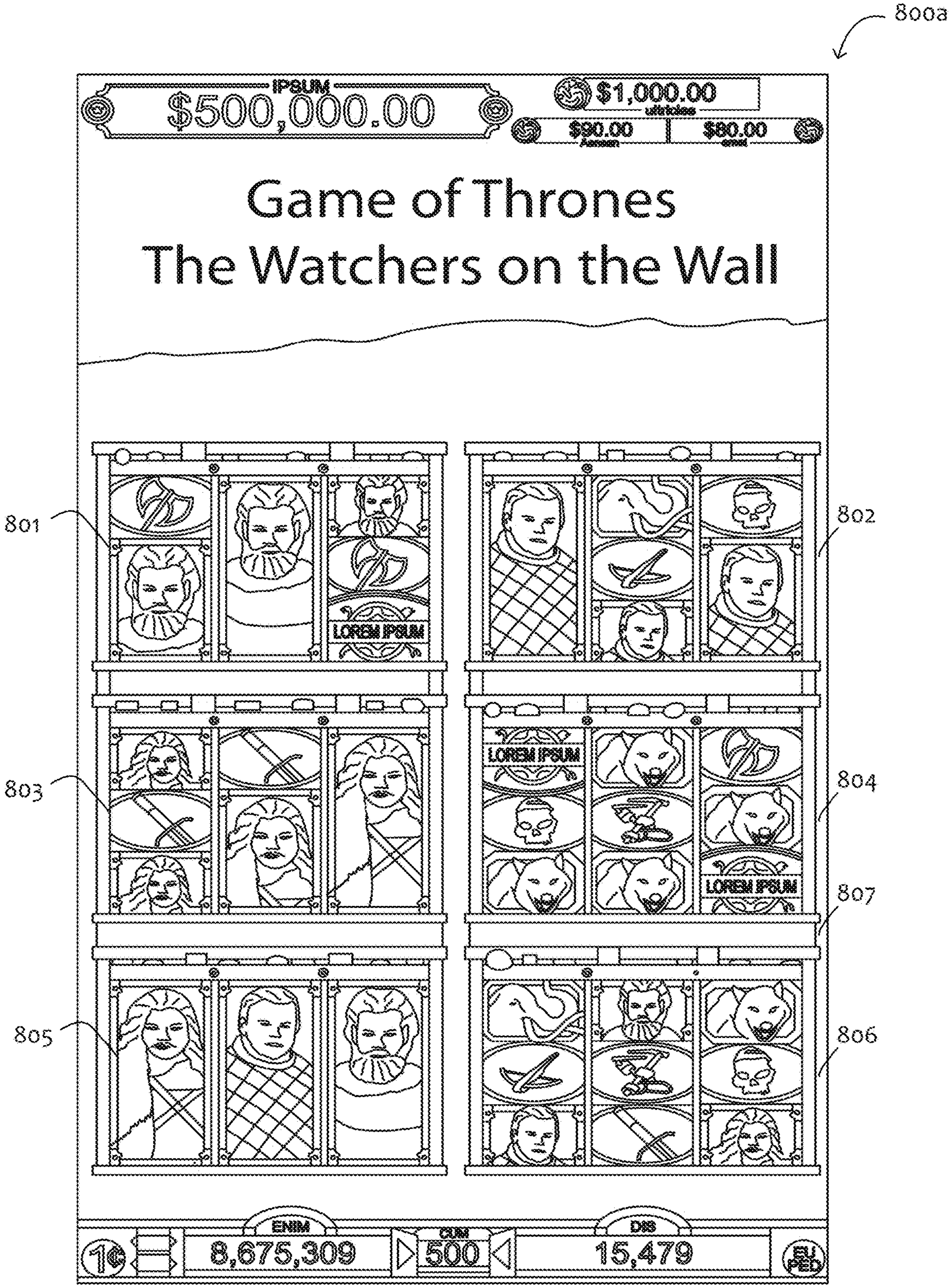
FIG. 4A illustrates an exemplary game matrix with six games.

FIG. 4A illustrates a game matrix 800*a* in the form of a Game of Thrones—the Watchers on the Wall™ feature game with six game instances 801, 802, 803, 804, 805, 806. (Game of Thrones is a registered trademark of Home Box Office, Inc.) As shown, game instances 801, 802, 803, 804, 805, 806 have respective 3×3 matrices of display positions, or a total of nine display positions per game. In some embodiments, the game controller 202 of FIG. 2 plays game instances 801, 802, 803, 804, 805, 806 simultaneously as discussed above. In some cases, the game controller 202 of FIG. 2 uses Reel Power™ to evaluate the displayed symbols of each of the game instances 801, 802, 803, 804, 805, 806 for wins. As such, each of the game instances 801, 802, 803, 804, 805, 806 may pay 27 ways using Reel Power™.

Figure 4B:
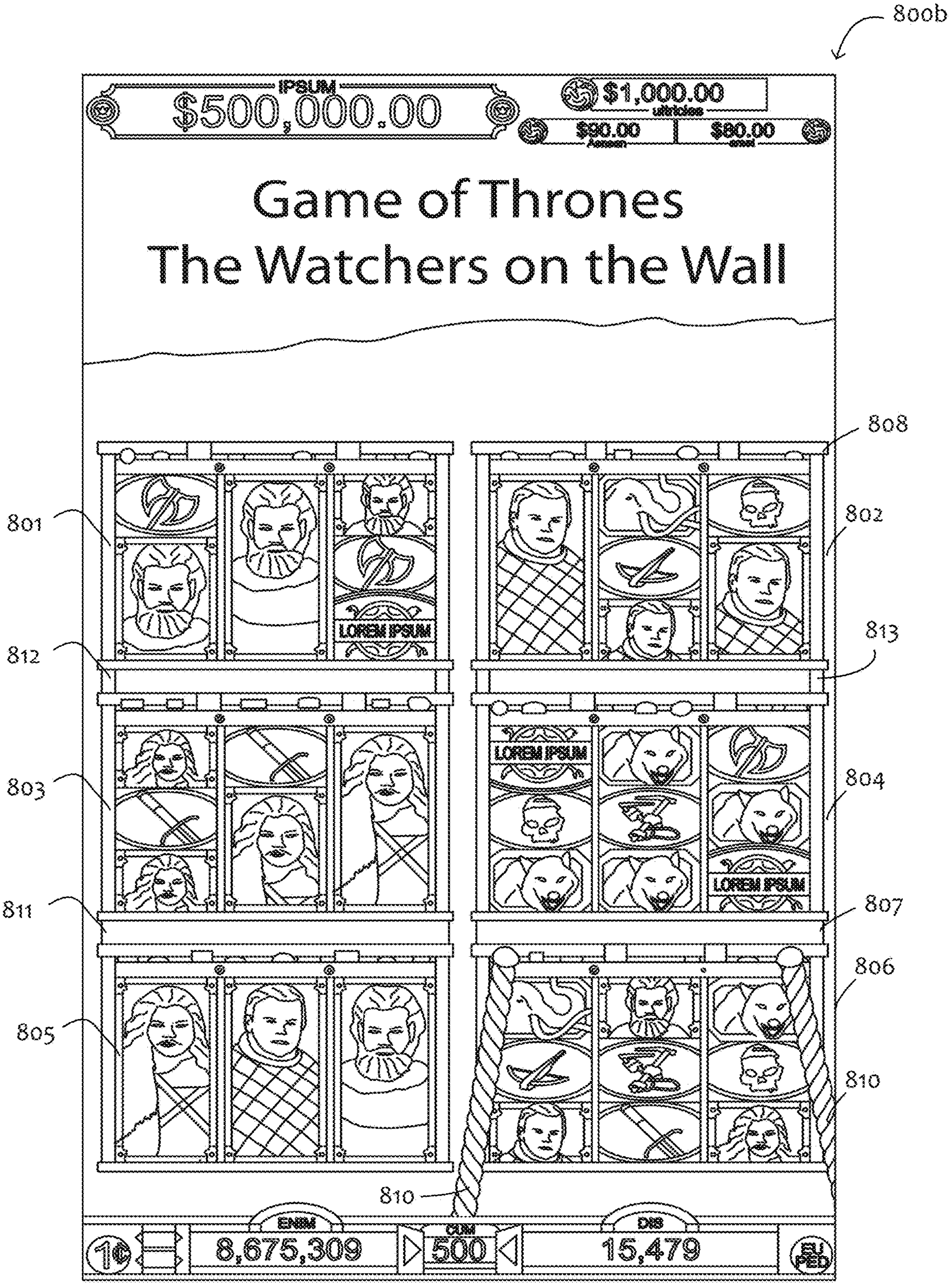
FIG. 4B illustrates a second exemplary game matrix with the games of FIG. 4A satisfying a merging condition.

FIG. 4B illustrates a second exemplary game matrix 800*b* with the game instances 804 and 806 when a merging condition is satisfied or a trigger event occurs. In some embodiments, the merging condition is satisfied or a trigger event occurs when the game instances 804 and 806 have been played a predetermined number of times. In other embodiments, the merging condition or a trigger event may include an appearance of a predetermined symbol in game instances 804 and 806. Other merging conditions or trigger events may also be used. For example, the merging condition is satisfied when both the first game instance and the second game instance are winning instances.

As shown, the game instances 801, 802, 803, 804, 805, 806 may be separated by scaffolding, framing, support, divider, barrier, gate, or separator 807 on a wall 808. As shown, a plurality of ropes 810 may be attached to a section of the separator 807 between game instance 804 and game instance 806. In some embodiments, the plurality of ropes 810 may be animated as being pulled by one or more woolly mammoths (not shown). As the one or more woolly mammoths pull the plurality of ropes 810, the separator 807 may be pulled away from the wall 808, which initiates a merging of game instance 804 and game instance 806 into a merged game instance. In some embodiments, the merging may be accompanied by a grinding noise as the one or more woolly mammoths pull away the separator 807 with the plurality of ropes 810. In some embodiments, the merging may also be accompanied by animating nibbles falling away as the separator 807 is being pulled away from the wall 808.

When the merging condition has been met, the game controller 202 may merge game instances 804 and 806, for example, by animating a removal of the separator 807 between game instances 804 and 806, followed by an insertion of additional display positions. The removal of the separator 807 may be further animated via the plurality of ropes 810 pulling the separator 807 away from the wall 808. For example, as shown in FIG. 4B, after game instances 804 and 806 have been played a predetermined number of times, the separator 807 between game instances 804 and 806 may be removed or pulled away with the plurality of ropes 810. Although FIG. 4B shows that the separator 807 between game instances 804 and 806 is being pulled away, other separators between other games may also be removed or pulled away in other embodiments. For example, one or more of separator 811, separator 812, and separator 813 may be animated as being pulled away with another plurality of ropes (not shown) attached to separator 811, separator 812, and separator 813, respectively.

Figure 4C:
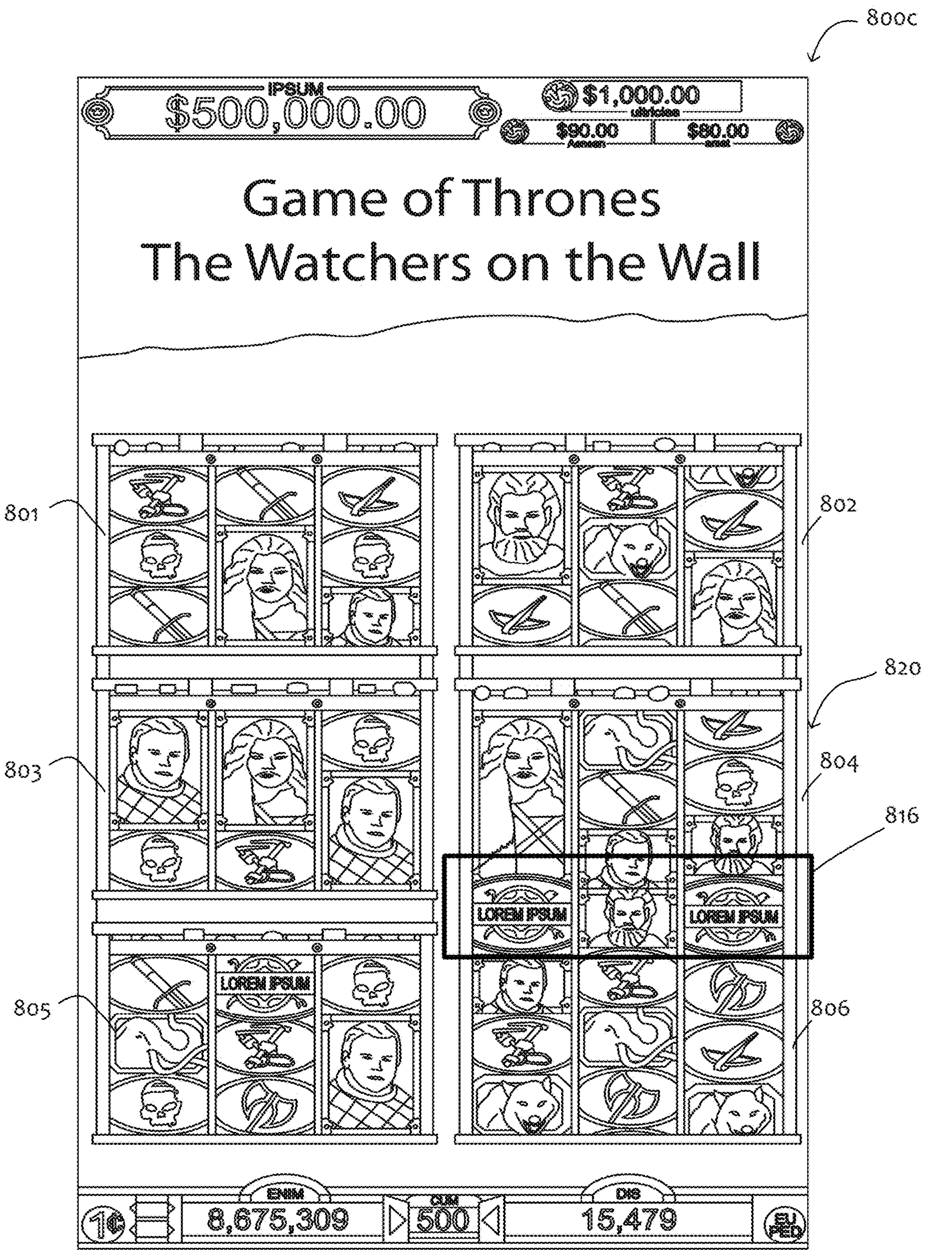
FIG. 4C illustrates a third exemplary game matrix having a merged game.

FIG. 4C illustrates a third exemplary game matrix 800*c* with game instances 804 and 806 having been merged into a merged game instance 820. That is, the separator 807 between game instances 804 and 806 has been removed or pulled away with the plurality of ropes 810 as shown in FIG. 4B, and is replaced with a plurality of additional display positions 816. After the game instances 804 and 806 have merged with the additional display positions 816 into the merged game instance 820, the merged game instance 820 includes two 3×3 game matrices, or 18 display positions and the additional display positions 816. As a result, the merged game 820 has a 7×3 matrix, or a total of 21 display positions. The merged game instance 820 may pay 343 ways using Reel Power™.

In some embodiments, as discussed above, the game controller 202 of FIG. 2 may continue to play game instances 804 and 806 individually, while the game controller 202 of FIG. 2 may randomly select symbols for the additional display positions 816 from a special symbol set that includes both wild symbols and predetermined symbols. As shown, the additional display positions 816 display two wild symbols and a standard symbol.

Figure 5A:
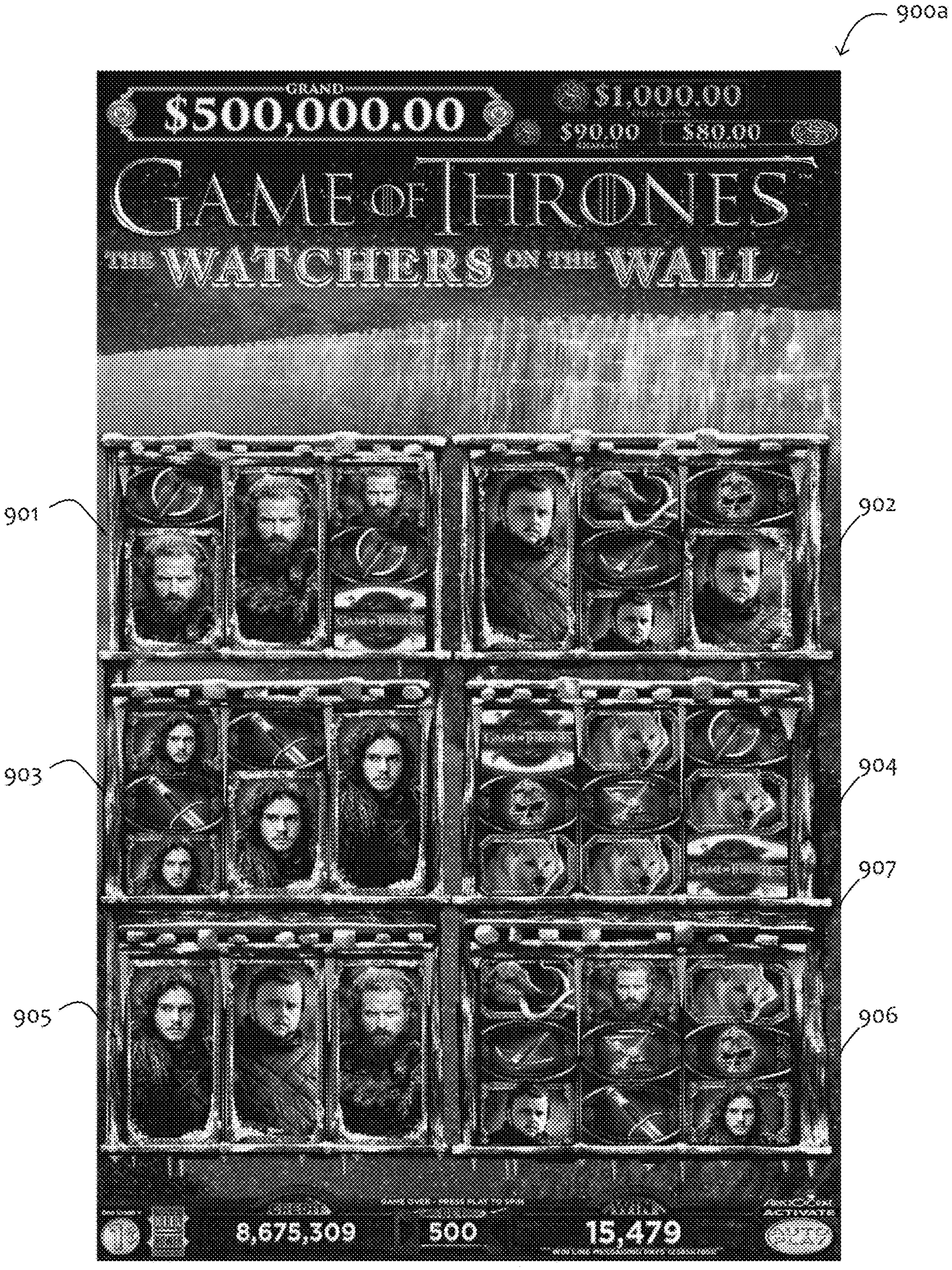
FIG. 5A illustrates an exemplary screen of the game matrix of FIG. 4A.

FIG. 5A illustrates an exemplary screen 900*a* similar to the game matrix 800*a* of FIG. 4A with six game instances 901, 902, 903, 904, 905, 906. As shown, game instances 901, 902, 903, 904, 905, 906 have respective 3×3 matrices of display positions. The game controller 202 of FIG. 2 plays game instances 901, 902, 903, 904, 905, 906 simultaneously as discussed above.

Figure 5B:
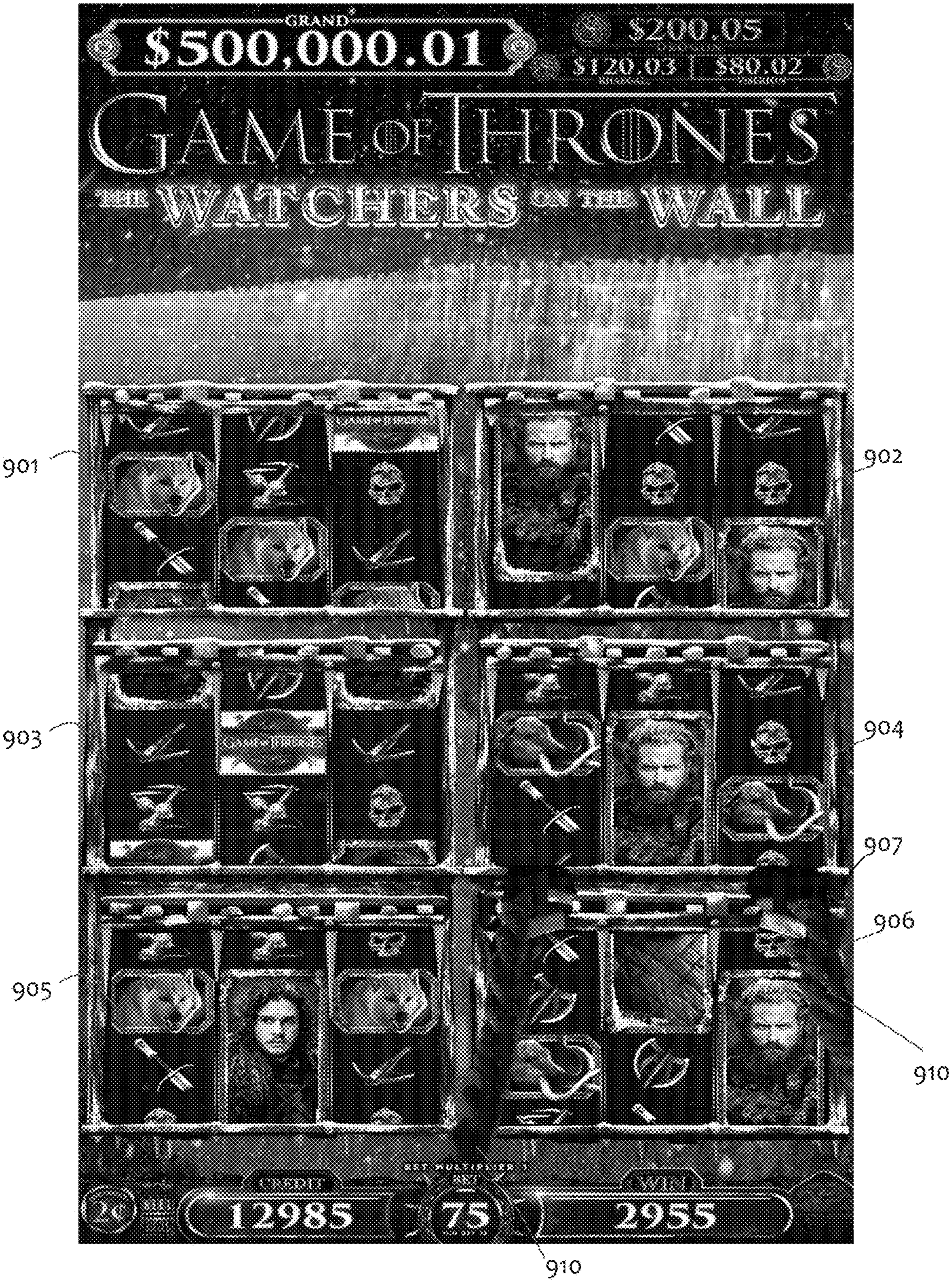
FIG. 5B illustrates an exemplary screen of the second exemplary game matrix of FIG. 4B.

FIG. 5B illustrates an exemplary screen 900*b* similar to the second exemplary game matrix 800*b* of FIG. 4B. Specifically, FIG. 5B illustrates that, after a merging condition has been met, the game controller 202 removes separator 907 between game instances 904 and 906 with a plurality of virtual ropes 910. As shown, the separator 907 between game instances 904 and 906 is animated as being pulled away with the virtual ropes 910. As discussed above, the merging condition may be satisfied when the game instances 904 and 906 have been played a predetermined number of times. In some other embodiments, other merging conditions may be used. For example, a merging condition may include an appearance of a predetermined symbol.

Figure 5C:
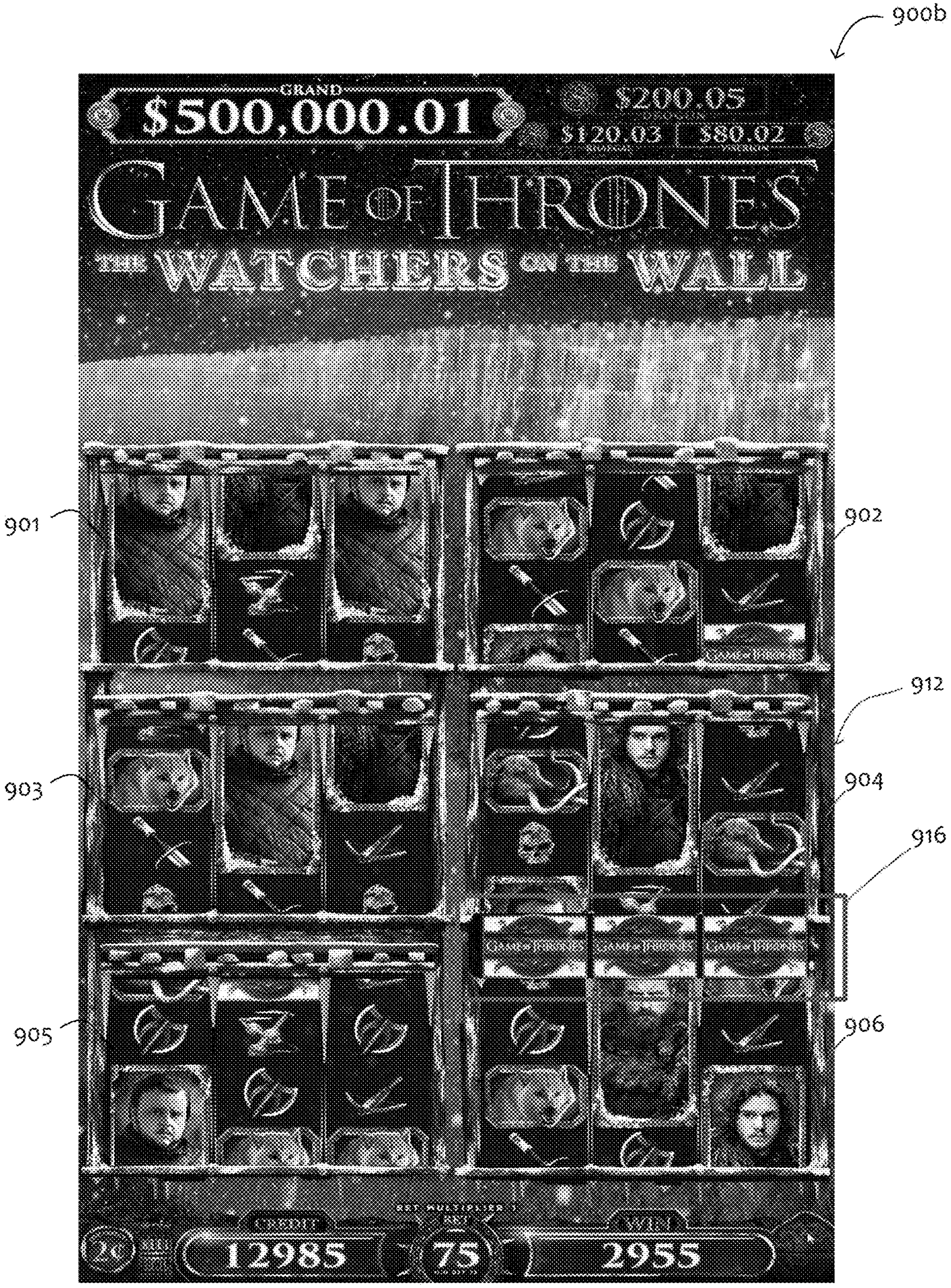
FIG. 5C illustrates an exemplary screen of the third exemplary game matrix having a merged game.

FIG. 5C illustrates an exemplary screen 900*c* similar to the third exemplary game matrix 800*c* of FIG. 4C with game instances 904 and 906 having been merged into a merged game instance 912 with a plurality of additional display positions 916. Specifically, the game controller 202 may cause or control the display to animate that the plurality of additional display positions 916 is replacing the separator 907 of FIG. 5C. As discussed above, the plurality of additional display positions 916 may select symbols selected from a special symbol set for display in the merged game. In some embodiments, the special symbol set may include wild symbols only. In some other embodiments, the special symbol set may include both wild symbols and predetermined symbols. As shown, the additional display positions 916 display three wild symbols.

Figure 6:
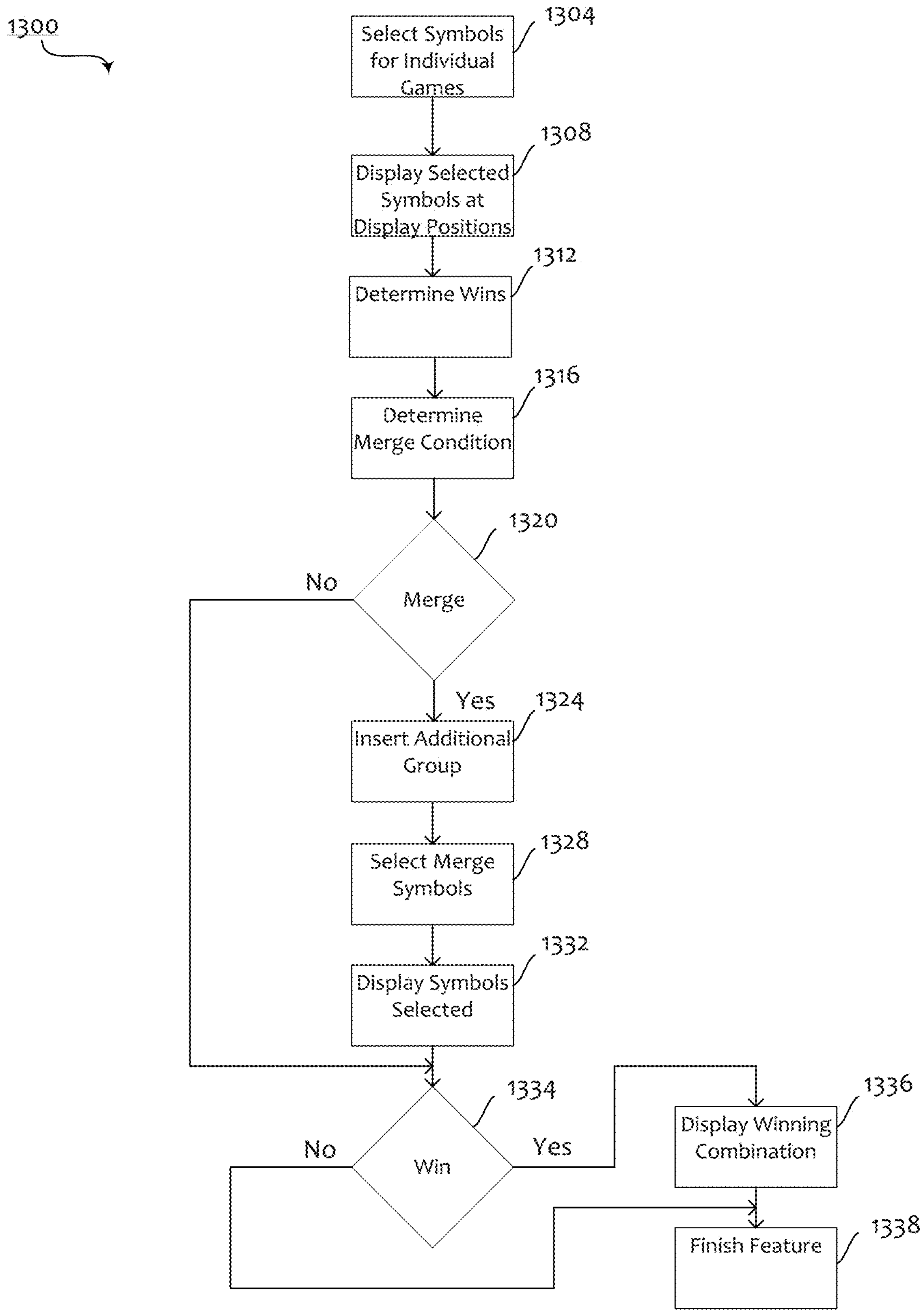
FIG. 6 illustrates a flow chart of a game merging process.

FIG. 6 illustrates a flow chart of a game merging process 1300. At block 1304, the game controller 202 of FIG. 2 selects a plurality of symbols for each of a plurality of games, for example, game instances 901, 902, 903, 904, 905, 906. As discussed, game instances 901, 902, 903, 904, 905, 906 may be divided by a plurality of separators, gates, dividers, or barriers. Also as discussed with respect to FIG. 4B, for example, separator 807 divides game instances 904 and 906.

Referring back to FIG. 6, at block 1308, the game controller 202 causes a display (e.g., the primary game display 240 of FIG. 2) to display the selected symbols at each of the games. At block 1312, the game merging process 1300 determines if the displayed symbols form any winning combination at the games.

Referring back to FIG. 6, at block 1316, the game merging process 1300 checks for a merging condition, as discussed above. For example, the game controller 202 may determine a number of times that each of the games has been played as a merging condition. If the game merging process 1300 determines that a merging condition exists in block 1320, the game merging process 1300 proceeds to block 1324. As discussed above, determining if a merging condition exists may include determining a number of times that a game has been played. In such cases, at block 1320, the game merging process 1300 determines a number of times that each of game instances 904, 906 has been played against a predetermined number of times, before animating a merging of game instances 904, 906. In some other embodiments, the merging condition may include an appearance of a predetermined symbol in one or more of the games. In still other embodiments, the merging condition may include whether both a first game instance depicts a winning outcome and an adjacent second game instance also depicts a winning outcome.

Referring back to FIG. 6, at block 1324, the game merging process 1300 may merge some or all of the games. For example, the display may display an animation that the first game instance and the second game instance merge to form a merged game instance of contiguous display positions. For example, the display may display an animation of adding or inserting a set of additional display positions between the first plurality and the second plurality of display positions. For example, the display may display an animation during the merging in which a rope, for example, the virtual rope 910 of FIG. 5B, is attached to the separator 907 of FIG. 5B. For another example, the display may display an animation during the merging in which the separator 907 is removed by pulling the separator 907 of FIG. 5A away from between the game instance 904 of FIG. 5B and the game instance 906 of FIG. 5B with the rope. As a result, a merged game instance (e.g., the merged game instance 820 of FIG. 4C and the merged game instance 912 of FIG. 5C) may include display positions of both the game instance 904 of FIG. 5B and the game instance 906 of FIG. 5B, and display positions of the set of additional display positions 916 of FIG. 5C. For example, when the game instance 904 of FIG. 5B and the game instance 906 of FIG. 5B are each a 3×3 matrix, or a total of nine display positions or reels per game, and the set of additional display positions include three display positions or reels, the merged game instance 912 may have a total of 21 display positions or reels. Further, as a result of merging some or all of the plurality of games into a merged game, the merged game instance has a number of display positions that is greater than a sum of display positions of the plurality of game instances before merging.

Referring back to FIG. 6, at block 1328, the game merging process 1300 selects symbols for the additional display positions from a special symbol set. In embodiments where the special symbol set includes fixed symbols only, such as, wild symbols, only fixed symbols are selected for the additional group of display positions. In embodiments where the special symbol set includes wild symbols and predetermined symbols, the game controller 202 may randomly select symbols from the special symbol set for display at the additional group of display positions. In some embodiments, the special symbol set and the first symbol set are the same. At block 1332, the game merging process 1300 may display symbols selected from the special symbol set. In some embodiments, symbols selected for display at the additional display positions 916 are displayed before game instances 904 and 906 stop spinning to reveal symbols selected. In some other embodiments, symbols selected for display at the additional display positions 916 are displayed when game instances 904 and 906 stop spinning to reveal symbols selected.

At block 1334, the game merging process 1300 may determine if the symbols selected for display include a winning combination. At block 1336, the game merging process 1300 may highlight the winning combination on the display (e.g., the primary game display 240 of FIG. 2), and the game controller 202 may also determine an award based on the winning combination, increment the credit balance on the credit meter based on the award determined. Although not shown, in some embodiments, the game merging process 1300 may cause a payout mechanism (e.g., the ticket printer 222 of FIG. 2) to pay an award corresponding to the winning combination based on pay tables associated with the games after all the games are finished. The game merging process 1300 terminates at block 1338.

While the disclosure has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system comprising:

at least one server coupled to a plurality of gaming devices coupled to a network, comprising at least one processor and memory storing a first set of symbols and a second set of symbols, the first set of symbols shares a plurality of common symbols with the second set of symbols, and instructions, which, when executed, cause the at least one processor to at least:

control a first gaming device to animate a first game instance for a first plurality of reels and a second game instance for a second plurality of reels on the first gaming device, and a separator separating the first plurality of reels from the second plurality of reels, control the first gaming device to animate a removal of the separator between the first plurality of reels and the second plurality of reels, control the first gaming device to animate a formation of a first merged game instance having the first plurality of reels, the second plurality of reels, and an additional group of reels replacing the separator removed and having the plurality of common symbols between the first plurality of reels and the second plurality of reels when a merging condition occurs, and transmit signals to the first gaming device indicative of a plurality of symbols randomly selected for the first plurality of reels and the second plurality of reels in the first merged game instance from the first set of symbols and the second set of symbols, respectively, based on one or more random numbers generated by a random number generator, and the plurality of common symbols in the additional group of reels, thereby increasing a selectability of common symbols in the first merged game instance.

2. The gaming system of claim 1, wherein the merging condition occurs when the first game instance has been played a predetermined number of times.

3. The gaming system of claim 1, wherein the merging condition occurs when the first game instance includes at least one of the plurality of common symbols.

4. The gaming system of claim 1, wherein the merging condition occurs when both the first game instance and the second game instance have winning outcomes.

5. The gaming system of claim 1, wherein the instructions, when executed, further cause the at least one processor to display a game outcome from the symbols selected for the first plurality of reels, the second plurality of reels, and the additional group of reels.

6. The gaming system of claim 1, wherein the plurality of common symbols are wild symbols.

7. The gaming system of claim 1, wherein the first set of symbols comprises the second set of symbols.

8. A method of operating a game in a gaming system having at least one server operable to communicate with a plurality of gaming devices in a network, and comprising at least one processor and memory storing a first set of symbols and a second set of symbols, the first set of symbols sharing a plurality of common symbols with the second set of symbols, and instructions, which, when executed, cause the at least one processor to at least the game, the method comprising:

causing to animate at a first gaming device a first game instance for a first plurality of reels and a second game instance for a second plurality of reels, and a separator separating the first plurality of reels from the second plurality of reels;

causing to animate at the first gaming device a removal of the separator between the first plurality of reels and the second plurality of reels;

causing to animate a merging of the first plurality of reels, the second plurality of reels, and an additional group of reels replacing the separator removed and having the plurality of common symbols into a first merged game instance when a merging condition occurs; and transmitting data to the first gaming device indicative of a new set of symbols selected, based on one or more random numbers generated by a random number generator, for the first plurality of reels and the second plurality of reels in the first merged game instance from the first set of symbols and the second set of symbols, respectively, to increase selectability of common symbols with the plurality of common symbols in the additional group of reels.

9. The method of claim 8, wherein the merging condition occurs when the first game instance has been played a predetermined number of times.

10. The method of claim 8, wherein the merging condition occurs when the first game instance includes at least one of the plurality of common symbols.

11. The method of claim 8, wherein the merging condition occurs when both the first game instance and the second game instance have winning outcomes.

12. The method of claim 8, further comprising forming a game outcome from the new set of symbols selected for the first plurality of reels, the second plurality of reels, and the additional group of reels.

13. The method of claim 8, wherein the plurality of common symbols are wild symbols.

14. The method of claim 8, wherein the first set of symbols comprises the second set of symbols.

15. A non-transitory computer-readable medium storing a first set of symbols and a second set of symbols, the first set of symbols shares a plurality of common symbols with the second set of symbols, and instructions for conducting a game in a gaming system comprising at least one processor, and the instructions, which, when executed, cause the at least one processor to perform at least the steps of:

controlling a first gaming device to animate a first game instance for a first plurality of reels and a second game instance for a second plurality of reels, and a separator separating the first plurality of reels from the second plurality of reels;

controlling the first gaming device to animate a removal of the separator between the first plurality of reels and the second plurality of reels;

causing the first gaming device to initiate a merging of the first plurality of reels, the second plurality of reels, and an additional group of reels replacing the separator removed and having the plurality of common symbols between the first plurality of reels and the second plurality of reels when a merging condition occurs; and transmitting signals to the first gaming device indicative of a new set of symbols selected randomly for the first plurality of reels and the second plurality of reels from the first set of symbols and the second set of symbols, respectively, based on one or more random numbers generated by a random number generator, and the plurality of common symbols in the additional group of reels, to increase a selectability of common symbols.

16. The non-transitory computer-readable medium of claim 15, wherein the merging condition occurs when the first game instance has been played a predetermined number of times.

17. The non-transitory computer-readable medium of claim 15, wherein the merging condition occurs when the first game instance includes at least one of the plurality of common symbols.

18. The non-transitory computer-readable medium of claim 15, wherein the merging condition occurs when both the first game instance and the second game instance have winning outcomes.

19. The non-transitory computer-readable medium of claim 15, wherein the instructions, when executed, further cause the at least one processor to perform the step of displaying a game outcome from the new set of symbols selected for the first plurality of reels, the second plurality of reels, and the additional group of reels.

20. The non-transitory computer-readable medium of claim 15, wherein the first set of symbols comprises the second set of symbols.

* * * * *